United States Patent [19]

Ancona et al.

[11] Patent Number: 5,088,392
[45] Date of Patent: Feb. 18, 1992

[54] KITCHEN UNIT

[75] Inventors: Bruce Ancona; Jane Ancona, both of New York City, N.Y.

[73] Assignee: M. Kamenstein, Inc., White Plains, N.Y.

[21] Appl. No.: 607,620

[22] Filed: Nov. 8, 1990

[51] Int. Cl.5 .................. A47J 19/02; A47J 43/14; A23N 1/00
[52] U.S. Cl. .................. 99/499; 99/505; 99/506; 99/508; 220/4.03; 220/4.21; 241/100; D7/665
[58] Field of Search .................. 99/496-500, 99/501, 504-506, 508, 507; 241/100; 220/4.03, 4.21, 4.26, 625, 630; D7/665, 678; 83/167

[56] References Cited

U.S. PATENT DOCUMENTS

| | | |
|---|---|---|
| 587,903 | 8/1897 | Wines .................. 99/508 |
| 933,949 | 9/1909 | Bailiff .................. 241/100 X |
| 1,141,834 | 6/1915 | Schatterman .................. 99/508 |
| 1,327,929 | 1/1920 | Tripke .................. 99/499 |
| 1,999,886 | 4/1935 | Todd .................. 241/100 X |
| 2,087,979 | 7/1937 | Kennedy .................. 99/505 |
| 2,137,366 | 11/1938 | Sundstrand .................. 241/100 X |
| 2,781,069 | 2/1957 | Byrd .................. 99/508 |
| 3,583,455 | 6/1971 | Ostrowsky . | 
| 3,741,379 | 6/1973 | Kappler et al. .................. 220/4.21 X |
| 4,212,430 | 7/1980 | Dale et al. .................. 241/100 X |
| 4,212,431 | 7/1980 | Doyel .................. 241/100 |
| 4,255,996 | 3/1981 | Choksi et al. .................. 83/167 X |

FOREIGN PATENT DOCUMENTS

| | | |
|---|---|---|
| 3035014 | 4/1982 | Fed. Rep. of Germany .................. 99/505 |
| 2481911 | 11/1981 | France .................. 99/505 |
| 362187 | 12/1931 | United Kingdom . |
| 866138 | 4/1961 | United Kingdom . |

Primary Examiner—Timothy F. Simone
Attorney, Agent, or Firm—James Albert Drobile; Robert A. Koons, Jr.; Robert E. Rosenthal

[57] ABSTRACT

A kitchen article having a body, the body having a bottom sidewalls, a supporting structure formed in the body for supporting a kitchen implement over a top of the body, a bowl formed in an upper portion of the body, a spout formed at one location in an upper portion of a wall of the bowl and extending to a lip in the exterior of the body, and a chamber below a lower surface of the bowl and above the body. The body has provision therein for access to the chamber, the chamber being large enough to accommodate an implement of the proper size to fit on the supporting structure.

33 Claims, 3 Drawing Sheets 5,088,392

KITCHEN UNIT

BACKGROUND OF THE INVENTION

This invention relates to implements for use in the kitchen, and especially to graters, juicers, and egg separators. This invention also relates to storage units for such implements. This invention also relates to stands for such implements, and to combinations of such implements with measuring cup and bowls.

A fairly large variety of kitchen implements produce liquid or small solid particles. Such implements include graters, juicers, and egg separators. Such implements are most easily used with a bowl directly beneath to catch the particles or liquid.

A problem experienced with a large number of kitchen implements is the providing of sufficient space for various items. Compact storage of kitchen items is accordingly highly desirable.

It is accordingly an object of this invention to provide a stand on which a grater, juicer, egg separator or the like may be mounted during use, while providing a bowl for particles and liquids.

It is accordingly an object of this invention to provide a stand on which a grater, juicer, egg separator may be mounted during use, with a bowl provided for particles and liquid produced.

It is an object of this invention to provide a set of kitchen items including a stand for a grater, juicer, egg separator or the like, and graters, juicers, and egg separators that fit such a stand.

It is an object of this invention to provide compact storage for kitchen items such as graters, juicers, and egg separators.

Further objects and advantages of the invention will become apparent from the description of a preferred embodiment which follows.

SUMMARY OF THE INVENTION

A kitchen article has a body including a bottom and sidewalls. Supporting means are formed in the body for supporting a kitchen implement over a top of the body. A bowl is formed in an upper portion of the body, with a spout being formed in a perimeter of the bowl at one location. A chamber is provided below a lower surface of the bowl and above the bottom of the body. The body has provision for access to the chamber. The chamber is large enough to accommodate at least one kitchen implement of the proper size to fit on the supporting means.

A set of kitchen items includes a main unit, and at least one kitchen implement. The main unit has a body having sidewalls and a bottom wall. Supporting means are formed in the body for supporting one of the kitchen implements over a top of the body. A bowl is formed in an upper portion of the body. A chamber is provided in the body below the bowl and above the bottom. The body has provision therein for access to the chamber. The chamber is large enough to accommodate at least one kitchen implement of the proper size to be supported on the supporting means. A perimeter of at least one implement is adapted to be supported by the supporting means, and the implement is sufficiently small to fit in the chamber.

DETAILED DESCRIPTION OF A PREFERRED EMBODIMENT

Figure 1:
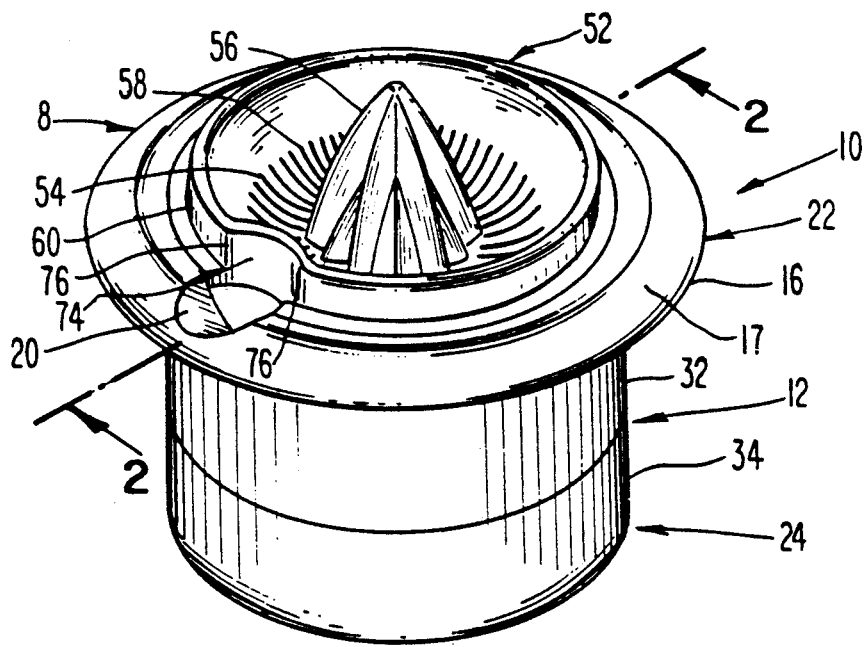
FIG. 1 is a perspective view of a kitchen unit according to the invention.
Figure 2:
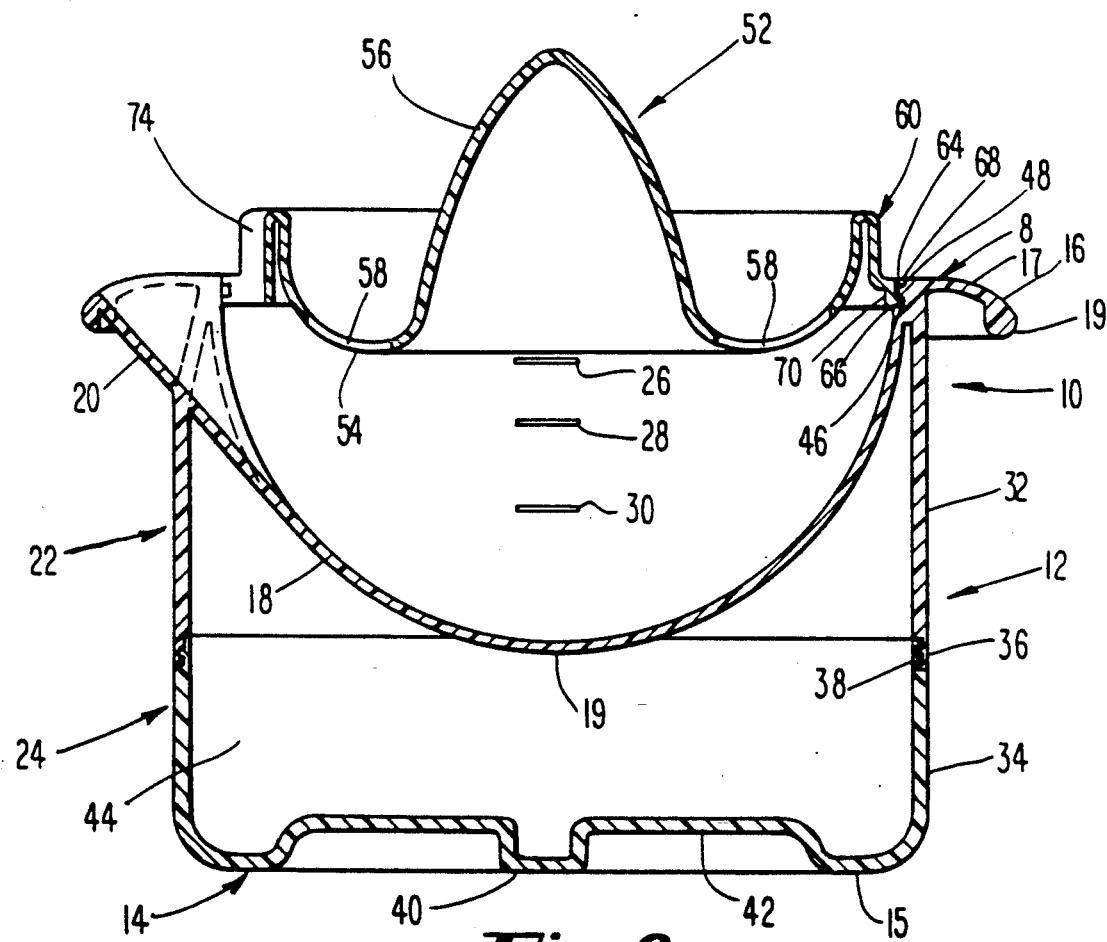
FIG. 2 is a sectional view taken along the line 2—2 of FIG. 1, of a kitchen unit according to the invention.

With reference to FIGS. 1 and 2, a kitchen unit 10 according to the invention is shown. The kitchen unit 10 is shown with a juicer 52 in position to be used.

Kitchen unit 10 is a substantially hollow, cylindrical body. Kitchen unit 10 has a cylindrical sidewall 12, and a bottom 14. The top of the kitchen unit 10 is open. A top structure 8 is provided about the perimeter of the open top of kitchen unit 10.

A bowl 18, seen in FIG. 2, is located in the interior of the unit 10. A rim of bowl 18 is integrally formed with top structure 8. Bowl 18 may be substantially hemispherical. A spout 20 is formed in bowl 18 and top structure 8, at one location along the perimeter of the bowl.

Top structure 8 includes a rim 16 projecting radially outward. A portion of rim 16 closest to sidewall 12 is annular and substantially horizontal. An upper surface 17 of rim 16 accordingly provides a substantially flat, broad, annular surface. A user may press down on the top surface of rim 16 to maintain the unit stable when in use. This feature is advantageous while using a grater or juicer. An outer portion of rim 16 extends downward and terminates in a thick outer lip 19. Lip 19 of rim 16 provides a handgrip for the unit 10. A user may grip rim 16 from underneath. This feature is also advantageous when using a grater or juicer.

Bowl 18 occupies only an upper portion of the interior of unit 10. A chamber 44 is provided below a lower surface 19 of bowl 18. The interior surface of bottom 14 is the bottom of chamber 44. Sidewall 12 constitutes the wall of chamber 44. Chamber 44 is substantially cylindrical.

Bowl 18 may be provided with volume markings 26, 28 and 30. The markings allow a user to see how much liquid or particulate material is contained in bowl 18.

A ledge 46 is provided about the rim of bowl 18. Ledge 46 is the innermost portion of top structure 8. Ledge 46 provides a horizontal supporting surface. Ledge 46 is substantially annular and is interrupted at the location of spout 20.

An outer edge of ledge 46 coincides with a bottom edge of vertical wall 48. Vertical wall 48 is substantially cylindrical, but is interrupted at the location of spout 20.

Figure 3:
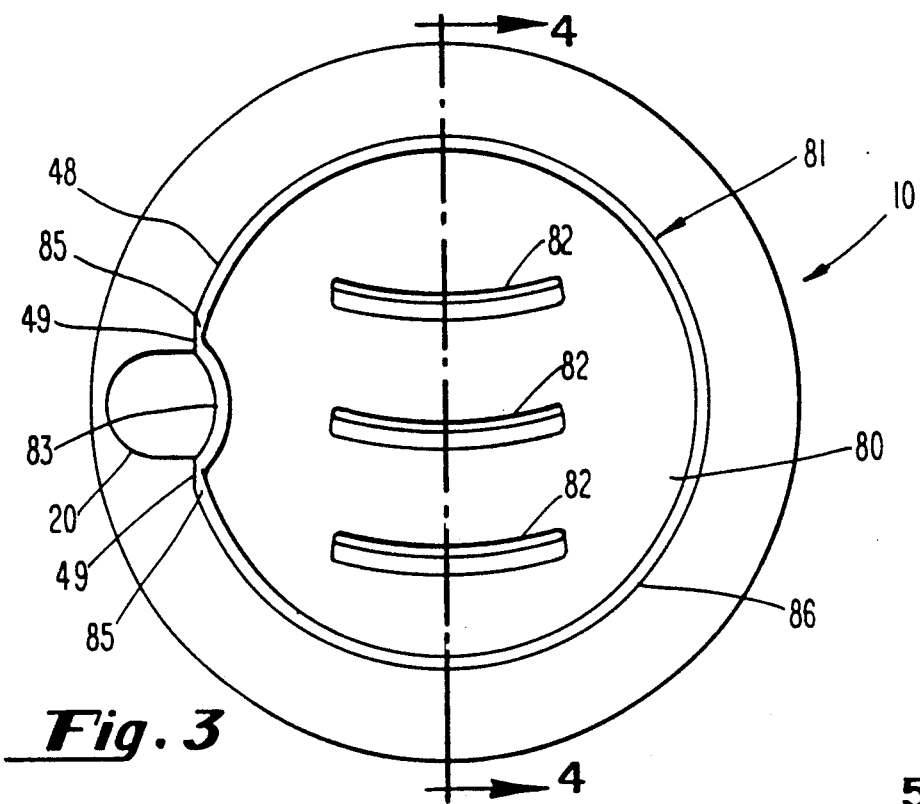
FIG. 3 is a top view of a kitchen unit according to the invention sharing a grater in position for use.

Referring to FIG. 3, it will be seen that on each side of spout 20, vertical wall 48 is not cylindrical. Rather, vertical wall 48 has straight segments 49 adjacent to and on either side of spout 20. The purpose of straight segments 49 is to prevent a kitchen implement, such as a juicer 52, from rotating during use. A kitchen implement may be provided having a perimeter which is substantially circular, but has straight segments configured to match straight segments 49. Such a kitchen implement, when seated on ledge 46, will not rotate. It will be appreciated that vertical wall 48 may have other configurations which are not cylindrical.

Figure 6:
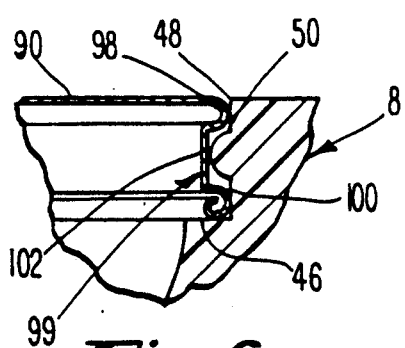
FIG. 6 is an alternative structure that may be provided in place of the structure of FIG. 5.
Figure 5:
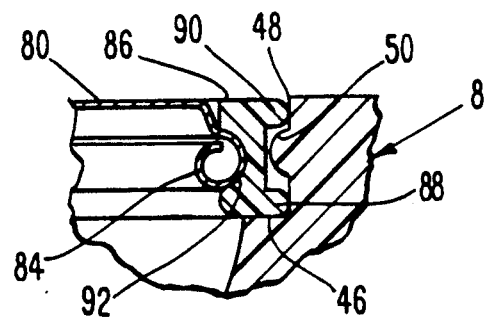
FIG. 5 is an enlargement of the portion of FIG. 4 designated "5".

As may be seen in FIGS. 5 and 6, a flange 50 projects inward from the middle of vertical wall 48. Flange 50 serves the purpose of retaining kitchen implements. Flange 50 may be either continuous or composed of separate sections. Flange 50 has a substantially semi-circular cross-section.

Flange 50 extends inward from wall 48 approximately half the width of ledge 46. Thus an implement of a certain size may rest on ledge 46 without having provision for interlocking with flange 50. The egg separator, discussed below, rests on ledge 46 in this manner.

The interior edge of ledge 46 coincides with the top of the interior surface of bowl 18. Top structure 8 is mounted on the top of sidewall 12. Bowl 18, top structure 8, and an upper section 32 of sidewall 12 are desirably integrally formed of plastic.

Kitchen unit 10 is divided into bottom section 24 and top section 22. Bottom section 24 includes bottom 14 of unit 10 and bottom section sidewall 34. Top section 22 includes top section sidewall 32, bowl 18, and top structure 8. Both bottom section 24 and top section 22 are desirably integrally formed of plastic.

Bottom section 24 and top section 22 are detachably engageable to one another. Bottom section 24 and top section 22 are screwably engageable. The lowest portion of top section sidewall 32 is a threaded portion 36. Top section sidewall 32 is threaded on the interior. The uppermost portion of bottom section sidewall 34 is a threaded portion 38. Bottom section sidewall 34 is threaded on the exterior. The threaded portion 36 of top section sidewall 32 and threaded portion 38 of bottom section sidewall 34 are threaded so as to screw together. The cylindrical form of sidewall 12 is advantageous in allowing the bottom section 24 and top section 22 to be screwably engageable in this manner.

Bottom 14 of the unit 10 provides a grip for use in unscrewing bottom section 24 from top section 22 or screwing bottom section 24 back into top section 22. A lower surface of bottom 14 has an outer annular section 15 on which the unit rests. Interior to outer section 15 there is a raised annular section 42. At the center, depending downward from raised annular section 42, is a cylindrical knob 40. A user may grip knob 40 when turning bottom section 24.

Bottom section sidewall 34 is approximately the same height as the bottom of bowl 18. As a result, approximately all of the interior of bottom section 24 is storage chamber 44.

Storage chamber 44 is desirably tall enough to accommodate several kitchen devices. For example, storage chamber 44 may be of a proper size to accommodate three graters and an egg separator.

The bottom edge of top section sidewall 32 is lower than a lower surface of bowl 18. As a result, the top section 22 will stand with bottom section 24 detached. This allows a user to select an implement from storage chamber 44 and use the unit without reattaching top section 22 and bottom section 24. This structure is advantageous. A single implement may be selected from chamber 44. While one implement is in use, with top section 22 used as a stand, the other implements may remain in chamber 44. Implements may also remain in chamber 44 while the top section 22 is washed.

Juicer 52 will now be described, with reference to FIGS. 1 and 2. Juicer 52 has a central reamer 56, a juicer bowl 54 about the reamer 56, and a support member 60 provided about the perimeter of the juicer exterior to the juicer bowl 54. Reamer 56 is conventional and well-known in the art. Juicer bowl 54 is also conventional. Juicer bowl 54 is an annular trough about the base of reamer 56. A large number of radial shots 58 are provided in the bottom of juicer bowl 54. This arrangement of reamer 56 and juicer bowl 54 with slots 58 allows juice, pulp and seeds to fall from the reamer into juicer bowl 54. The juice falls through slots 56, while seeds and a substantial portion of the pulp remain in juicer bowl 54.

Juicer support member 60 is adapted to support juicer 52 on top structure 8. Juicer support member 60 constitutes a perimeter of juicer 52. Juicer support member 60 has a cylindrical main piece 62 depending downward from an outer rim of juicer bowl 54. Depending radially outward from a lower edge of main piece 62 is an attaching member 64. Attaching member 64 includes a vertical cylindrical member 70, a horizontal lower flange 66, and a horizontal upper flange 68. Upper flange 68 projects radially outward from the top of vertical cylindrical member 70. Lower flange 66 extends radially outward from the bottom of vertical cylindrical member 70.

Lower flange 66 has an outer diameter that is selected so that lower flange 66 will rest on ledge 46. Lower flange 66 has a diameter slightly greater than the inner diameter of flange 50. The vertical thickness of lower flange 66 is selected so that lower flange 66, when resting on ledge 46, fits below flange 50 of vertical wall 48. A sufficient distance is provided between lower flange 66 and upper flange 68 that uppe flange 68 is above flange 50. Juicer 52 thus snaps securely and removably into kitchen unit 10. Juicer 52 specifically snaps securely and removably in place into top structure 8 over the open top of unit 10. As noted above, a top rim of bowl 18 coincides with ledge 46. As a result, juice will fall through slots 58 into bowl 18 without spilling.

Juicer 52 may be inverted for compact storage. Attaching member 64 may be snapped into place in top structure 8 with juicer 52 inverted. The outer diameter of upper flange 68 is greater than the inner diameter of flange 50 and less than the diameter of wall 48. The vertical thickness of upper flange 68 is less than the vertical distance between ledge 46 and the lower surface of flange 50. Thus, when juicer 52 is inverted, upper flange 68 rests on ledge 46. The size of reamer 56 is selected so that, when juicer 52 is inverted, reamer 56 is contained within bowl 18.

A fingerhold 74 is provided along a portion of juicer support member 60. The direction of curvature of juicer support member 60 is reversed at fingerhold 74. The outer rim of juicer bowl 54 is also curved inward toward reamer 56 at fingerhold 74. Attaching member 64 is not provided on the portion of juicer support member 60 at fingerhold 74. Fingerhold 74 is aligned with spout 20 in kitchen unit 10. A space is accordingly provided between spout 20 and fingerhold 74. A user may insert a finger between spout 20 and fingerhold 74. By pressing upward with a finger on the bottom of cylindrical main piece 62, the user may remove juicer 52 from unit 10.

On either side of fingerhold 74, there are provided straight sections 76 of juicer support member 60. These straight sections 76 correspond to straight segments 49 of vertical wall 48. Because of this configuration, juicer 52 cannot rotate when snapped in place on unit 10. This is advantageous because of the manner in which a juicer is ordinarily used. One-half of a citrus fruit, for example, is simultaneously pressed down on and rotated about the reamer. If the juicer were circular, it would tend to rotate.

Figure 4:
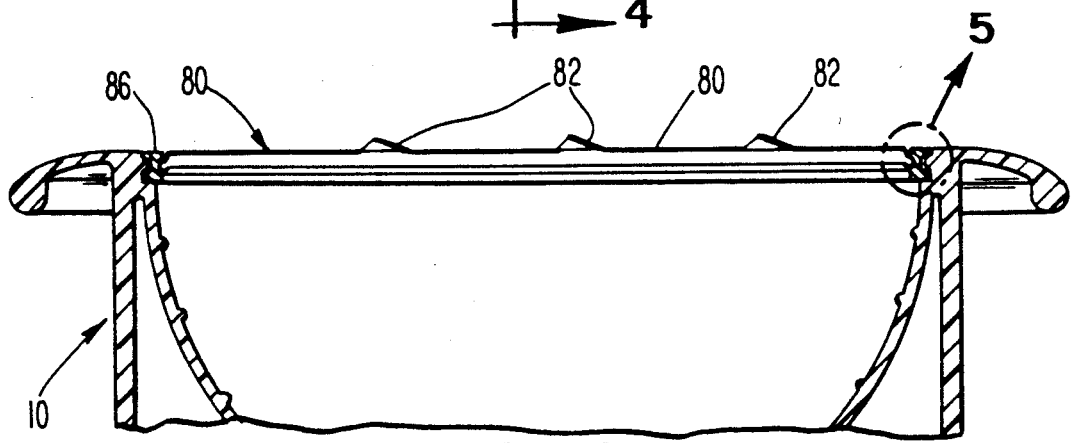
FIG. 4 is a partial sectional view, taken along line 4—4 of FIG. 3, of a kitchen unit according to the invention.

With reference to FIGS. 3 and 4, a grater according to the invention will now be described. FIGS. 3 and 4 show a grater 81 according to the invention. Grater 81 is shown snapped into a kitchen unit 10 according to the invention. Grater 81 includes a grater board 80 and rim 86. A grater board 80 is a flat sheet of thin metal. Slicing slots 82 are provided in grater board 80. Slicing slots 82, as shown, are formed of a sliced separation in the sheet of this metal; one side of the separation is upturned to provide a sharp cutting edge. Many other sizes and configurations of cutting edges for grater boards are well known in the art and may be used in accordance with this invention. For example, a plurality of holes may be provided in the grater board, with a portion of the edge of each hole upturned to provide a cutting edge. By way of further example, a number of holes may be punched in the grater board to provide a very fine grater. In a set of kitchen items according to the invention, it is ordinarily desirable to provide a number of grater boards having various configurations of cutting edges The configuration of the exterior of a grater 81 may be seen from above in FIG. 3. A rim 86 constitutes a support member of grater board 81. A fingerhold 83 is provided at one location along a portion of rim 86, creating an indentation. Adjacent to fingerhold 83, on both sides thereof, straight segments 85 of the perimeter of the grater board are provided. Straight segments 85 are aligned with straight segments 49 of vertical wall 48 in the kitchen unit 10. This prevents the grater from rotating during use. Fingerhold 83 aligns with spout 20 in kitchen unit 10. A user may insert a finger in the space between spout 20 and fingerhold 83 to remove grater 81.

With reference to FIG. 5, the fitting of grater 81 into unit 10 will be described. FIG. 5 is an enlarged partial sectional view of a grater according to the invention fitted into top structure 8 of a kitchen unit 10 according to the invention.

Rim 86 is ring-like and substantially radially symmetric. Rim 86 is preferably made of plastic. Rim 86 has a substantially rectangular cross-section. The outer diameter of rim 86 is selected so that rim 86 rests on ledge 46. An upper flange 90 projects radially outward from the top of the outer side of rim 86. A lower flange 88 projects radially outward from the bottom of the outer side of rim 86. Lower flange 88 has an outer diameter slightly larger than an inner diameter of flange 50. Sufficient space is provided between upper flange 90 and lower flange 88 that flange 50 in vertical wall 48 will fit between upper flange 90 and lower flange 88. Thus the grater snaps in place on top structure 8 of kitchen unit 10 over the open top of kitchen unit 10. Thus the perimeter of grater 81 is adapted to permit grater 81 to be snapped in place. It will be seen that ledge 46 supports the grater when force is applied downward on the grater.

Rim 86 has a channel 92 on the inner side thereof. Channel 92 has a semicircular cross-section. The outer portion of grater board 80 is turned back on itself to provide a tube 84. Tube 84 fits into channel 92. This provides a permanent connection between grater board 80 and rim 86.

In tube 84, the edge of the grater board is turned to the interior of the tube 84. This prevents a user from being injured by the edge of the grater board.

With reference to FIG. 6, an alternate embodiment of the structure of FIG. 5 is disclosed. FIG. 6 is a partial sectional view of a grater board 90 and top structure 8 of a kitchen unit 10 according to the invention. The support member of grater board 90 is formed integrally with the grater board. The outer edge of the metal sheet of grater board 90 is turned downward and inward. This provides an upper flange 98. Below upper flange 98, the sheet extends straight downward. This provides a cylindrical vertical central portion 102. Below central portion 102 the metal sheet is turned first outward, and then down and inward, to provide a lower flange 100. Lower flange 100, central portion 102, and upper flange 98 constitute a support member 99 of the grater. The edge of the metal sheet is bent back into the interior of lower flange 100. As a result, the edge of the metal sheet is not exposed. This prevents users from being injured by the edge of the grater board.

The diameter of lower flange 100 is selected so that lower flange 100 will rest on ledge 46. Lower flange 100 is small enough to fit between ledge 46 and flange 50 of the top structure 8 of unit 10. The outer diameter of lower flange 100 is greater than the diameter of flange 50. Lower flange 100 extends under flange 50. Central portion 102 is sufficiently long that lower flange 100 may rest on ledge 46 of the top structure 8 while upper flange 98 is above flange 50 in vertical wall 48. This allows the grater to snap into top structure 8.

The graters are also of the proper size to fit in chamber 44 in bottom section 24 of the unit 10. This permits convenient storage of the graters. The number of graters that may be stored in chamber 44 depends on the height of chamber 44.

Particles created by grating fall into bowl 18. This occurs because the rim of bowl 18 is integrally formed with top structure 8 into which the grater fits. Spout 2 allows particles of certain types to pou easily.

Figure 7:
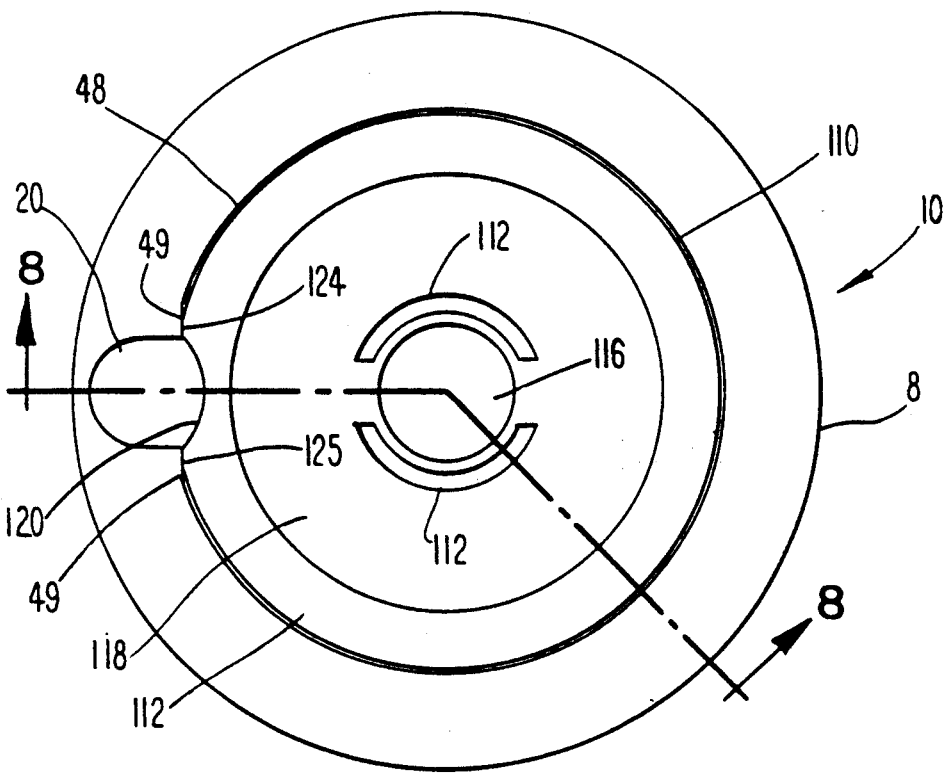
FIG. 7 is a top view of a kitchen unit according to the invention showing an egg separator in position for use.
Figure 8:
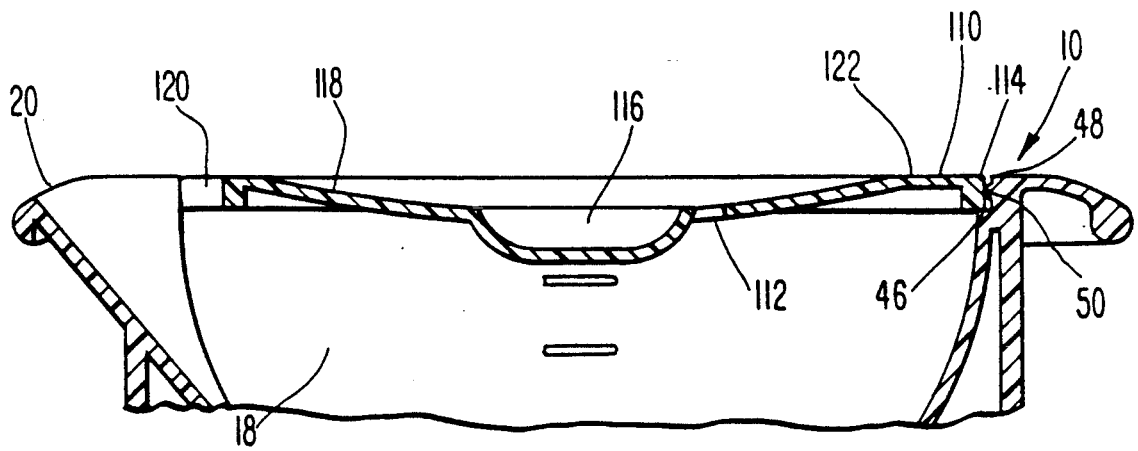
FIG. 8 is a partial sectional view, taken along line 8—8 of FIG. 7, of a kitchen unit according to the invention.

An egg separator 110 according to the invention will now be described with reference to FIGS. 7 and 8. FIG. 7 is a top view of kitchen unit 10 according to the invention with an egg separator 110 according to the invention shown in place in top structure 8. FIG. 8 is a partial sectional view of a kitchen unit 10 according to the invention with an egg separator 110 according to the invention shown in place.

Egg separator 110 has a central yolk cup 116. Yolk cup 116 is a shallow bowl, having a flat central surface. Exterior to the yolk cup 116 is a sloping radial surface 118. Radial surface 118 is sloped slightly downward toward yolk cup 116. Two curved slots 112 are provided in an inner portion of radial surface 118 around a greater portion of the perimeter of yolk cup 116. A horizontal annular surface 122 is provided exterior to sloped radial surface 118. A support member 114 depends downward from an outer edge of annular surface 122. Support member 114 is substantially annular and cylindrical.

Support member 114 constitutes a perimeter of egg separator 110. Support member 114 is of a proper size to rest on ledge 46. Support member 114 has a diameter less than the diameter of flange 50. Support member 114 does not snap into top structure 8. Thus it is important that flange 50 does not project inward as far as the width of ledge 46. The egg separator 110 does not snap in because the sudden motion of snapping the egg separator out might break the yolk A fingerhold 120 is provided at one location along a perimeter of the egg separator 110. Support member 114 has a reversed curvature at one location, thus providing fingerhold 120. In use, fingerhold 120 is aligned with spout 20. A user may place a finger below fingerhold 120 above spout 20 to remove the egg separator 110.

Support member 114 has straight segments 124, 125 on either side of fingerhold 120. Straight segments 124, 125 corresponds to straight segments 49 of vertical wall 48. As a result, egg separator 110 will not rotate.

The bowl 18 provides a receptacle for the egg white that drains through slots 112. Spout 20 allows convenient pouring of egg white.

The egg separator is desirably of the proper size to fit in chamber 44 for storage.

Figure 9:
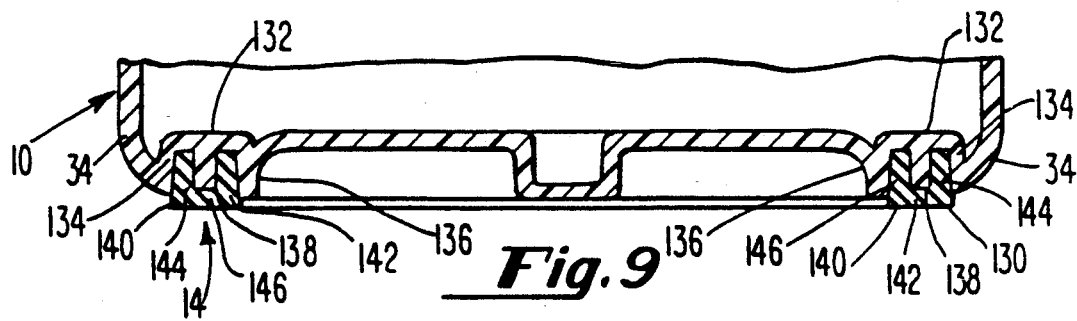
FIG. 9 is a partial sectional view, taken along line 2—2 of FIG. 1, of an alternate embodiment of a kitchen unit according to the invention.

FIG. 9 depicts an alternative embodiment of the base of unit 10. Bottom 14 has a radial channel 130 formed therein. Channel 130 has a substantially annular horizontal top wall 132, a vertical substantially cylindrical outer wall 134 and a vertical substantially cylindrical inner wall 136. The top of outer wall 134 joins the outer circumference of top wall 132. The bottom of outer wall 134 joins with the bottom of bottom section sidewall 34. The top of inner wall 136 joins the inner circumference of top wall 132. The inner side of inner wall 136 is joined to annular surface 42. Knob 40 depends downward from the center of surface 42. Vertical ring 138 depends downward from the center of top wall 132. Radial foot 140 is provided. Foot 140 has a substantially annular horizontal base 142. A cylindrical outer flange 144 extends upward from the outer circumference of base 142. A cylindrical inner flange 146 extends upward from the inner circumference of base 142. Outer flange 144 fits snugly between outer wall 134 of channel 130 and vertical ring 138. Inner flange 146 fits snugly between inner wall 136 of channel 130 and vertical ring 138. Foot 140 is desirably made of a material having a high coefficient of friction, such as rubber. Flanges 144 and 146 are compressed slightly in channel 132 for a secure fit.

It will be appreciated that there are considerable variations that can be accomplished in an apparatus of the invention without deporting from its scope. As a result, although a preferred embodiment of an apparatus of the invention has been described above, it is emphasized that the invention is not limited to a preferred embodiment and there exist alternative embodiments that are fully encompassed within the invention,s scope, which is intended to be limited only by the scope of the appended claims.

What is claimed is:

1. A kitchen article, comprising:
   (a) a body having a bottom and sidewalls;
   (b) supporting means formed in said body for supporting a kitchen implement over a top of said body;
   (c) a bowl formed in an upper portion of the interior of said body, a spout being formed in a perimeter of said bowl at one location; and
   (d) a chamber in said body below said bowl and above said bottom, said body having provision therein for access to said chamber, said chamber being large enough to accommodate at least one kitchen implement of the proper size to be supported on said supporting means.

2. A kitchen article as recited in claim 1, wherein said supporting means comprises a horizontal supporting surface about at least a portion of a rim of said bowl, an interior wall exterior to and extending upwardly from said horizontal supporting surface, and an inwardly-projecting flange on at least a portion of said interior wall.

3. A kitchen article as recited in claim 2, wherein said inwardly projecting flange does not project as far inward as the width of said horizontal supporting surface.

4. A kitchen article as recited in claim 2, wherein said interior wall is substantially cylindrical, except that a portion thereof is non-cylindrical, whereby a kitchen implement supported on said horizontal supporting surface may not rotate.

5. A kitchen article as recited in claim 4, wherein said horizontal supporting surface comprises a substantially annular ledge, which ledge is interrupted at the location of said spout.

6. A kitchen article as recited in claim 1, further comprising a rim projecting radially substantially horizontally outward about at least a substantial portion of the perimeter of said body.

7. A kitchen article as recited in claim 6, wherein said body is substantially cylindrical, and an upper surface of said rim is substantially annular.

8. A kitchen article as recited in claim 7, wherein said rim comprises a downward depending lip, thereby providing a handgrip.

9. A kitchen article as recited in claim 1, wherein said body comprises a top section including a top section sidewall, said bowl, and said supporting means, and a bottom section including a bottom section sidewall and said bottom, said top section and said bottom section being detachably engageable with one another.

10. A kitchen article as recited in claim 9, wherein said top section and said bottom section are screwably engageable with one another.

11. A kitchen article as recited in claim 10, wherein a lower surface of said bottom of said body includes a knob protruding downward therefrom.

12. A kitchen article as recited in claim 10, wherein said bottom section sidewall is cylindrical and threaded in an uppermost portion thereof and said top section sidewall is cylindrical and threaded in a lowest portion thereof, whereby said top section and said bottom section are screwably engageable with one another.

13. A kitchen article as recited in claim 9, wherein said top section sidewall extends at least as low as a lower surface of said bowl, whereby said top section may stand.

14. A kitchen article as recited in claim 9, wherein said supporting means comprises a horizontal supporting surface about at least a portion of said open top, an interior wall exterior to and extending upwardly from said horizontal supporting surface, and an inward-projecting flange on at least a portion of said interior wall.

15. A kitchen article as recited in claim 14, wherein said bottom section sidewall is cylindrical and threaded in an uppermost portion thereof and said top section sidewall is cylindrical and threaded in a lowest portion thereof, whereby said top section and said bottom section are screwably engageable with one another.

16. A kitchen article as recited in claim 15, wherein said upper portion of said sidewall extends at least as low as a lower surface of said bowl, whereby said top section may stand.

17. A kitchen article as recited in claim 15, wherein said inwardly-projecting flange does not project as far inward as the width of said horizontal supporting surface.

18. A kitchen article as recited in claim 17, wherein said interior wall is substantially cylindrical, except that a portion thereof is non-cylindrical, whereby a kitchen implement supported on said horizontal supporting surface may not rotate.

19. A kitchen article as recited in claim 1, wherein said bowl includes markings to indicate volume.

20. A set of kitchen items, comprising:
   (a) a main unit having a body, said body having sidewalls and a bottom, supporting means being formed in said body for supporting a kitchen implement over a top of said body, a bowl formed in an upper portion of said body, a chamber in said body below said bowl and above said bottom, said body having provision therein for access to said chamber, said chamber being large enough to accommodate at least one kitchen implement of the proper size to be supported on said supporting means; and
   (b) at least one kitchen implement, a perimeter of said implement being adapted to be supported by said supporting means and said implement being sufficiently small to fit in said chamber.

21. A set of kitchen items as recited in claim 20, wherein said supporting means comprises a horizontal supporting surface about at least a portion of a rim of said bowl, an interior wall exterior to and extending upwardly from said horizontal supporting surface and an inwardly-projecting flange on at least a portion of said interior wall.

22. A set of kitchen items as recited in claim 21, wherein said inwardly-projecting flange does not project as far inward as the width of said horizontal supporting surface.

23. A set of kitchen items as recited in claim 22, wherein at least one of said implements has a first type of support member, which support member is adapted to support said implement on said horizontal supporting surface, and which support member comprises an outwardly-projecting flange adapted to fit under said inwardly-projecting flange whereby said implement may be snapped in place in said supporting means and at least one of said implements has a second type of support member which is adapted to support said implement on said horizontal supporting surface but has no outwardly-projecting flange.

24. A set of kitchen items as recited in claim 23, wherein at least one of said implements having said first type of support member is a grater and at least one of said implements having said second type of support member is an egg separator.

25. A set of kitchen items as recited in claim 23, wherein at least one of said implements having said first type of support member is a juicer, and at least one of said implements having said second type of support member is an egg separator.

26. A set of kitchen items as recited in claim 25, wherein said juicer is adapted to be supported on said supporting means either in an upright position for use or in an inverted position for storage, a reamer of said juicer being small enough to be contained in said bowl when said juicer is in an inverted position for storage.

27. A set of kitchen items as recited in claim 23, wherein said interior wall is substantially cylindrical, except that a portion thereof is non-cylindrical, and wherein said support member of at least one of said implements is substantially circular, except that a portion thereof corresponding to said non-cylindrical portion of said interior wall is non-circular, whereby said at least one implement supported on said horizontal supporting surface may not rotate.

28. A set of kitchen items as recited in claim 23, wherein each of said implements further comprises a fingerhold at one location along the perimeter thereof.

29. A set of kitchen items as recited in claim 23, wherein said body of said main unit comprises a top section including a top section sidewall, said bowl and said supporting means, and a bottom section including a bottom section sidewall and said bottom, said top section and said bottom section being detachably engageable with on another.

30. A set of kitchen items as recited in claim 29, wherein said top section and said bottom section are screwably engageable with one another.

31. A set of kitchen items as recited in claim 30, wherein a lower surface of said bottom of said body includes a cylindrical knob at the center thereof.

32. A set of kitchen items as recited in claim 31, wherein said bottom section sidewall is cylindrical and threaded in an uppermost portion thereof and said top section of said sidewall is cylindrical and threaded in a lowest portion thereof, whereby said top section and said bottom section are screwably engageable with one another.

33. A set of kitchen items as recited in claim 32, wherein said top section sidewall extends at least as low as a lower surface of said bowl, whereby said top section may stand.

* * * * *